(12) United States Patent
Yan

(10) Patent No.: US 9,843,981 B2
(45) Date of Patent: Dec. 12, 2017

(54) NETWORK DEVICE ADDRESSING METHOD, DEVICE, AND SYSTEM

(71) Applicant: Huawei Technologies Co., Ltd., Shenzhen (CN)

(72) Inventor: Shizhuan Yan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/053,862

(22) Filed: Feb. 25, 2016

(65) Prior Publication Data

US 2016/0183157 A1 Jun. 23, 2016

Related U.S. Application Data

(63) Continuation of application No. PCT/CN2013/082279, filed on Aug. 26, 2013.

(51) Int. Cl.
| | |
|---|---|
| *H04W 92/02* | (2009.01) |
| *H04W 36/38* | (2009.01) |
| *H04W 8/12* | (2009.01) |
| *H04W 8/04* | (2009.01) |
| *H04W 88/00* | (2009.01) |
| *H04W 24/02* | (2009.01) |
| *H04W 88/18* | (2009.01) |

(52) U.S. Cl.
CPC ............. *H04W 36/38* (2013.01); *H04W 8/04* (2013.01); *H04W 8/12* (2013.01); *H04W 24/02* (2013.01); *H04W 88/005* (2013.01); *H04W 88/18* (2013.01)

(58) Field of Classification Search
CPC .......... H04W 8/12; H04W 8/04; H04W 8/26; H04W 36/38; H04W 88/18; H04W 24/02

USPC .......................................... 455/432.1, 432.2
See application file for complete search history.

(56) References Cited

U.S. PATENT DOCUMENTS

| | | |
|---|---|---|
| 2004/0190534 A1 | 9/2004 | Adrangi et al. |
| 2009/0036146 A1 | 2/2009 | Lamba et al. |
| 2010/0195613 A1* | 8/2010 | Hu .................... H04L 29/12896 370/329 |

(Continued)

FOREIGN PATENT DOCUMENTS

| | | |
|---|---|---|
| CN | 1768517 A | 5/2006 |
| CN | 101026568 A | 8/2007 |

(Continued)

*Primary Examiner* — Kamran Afshar
*Assistant Examiner* — Farid Seyedvosoghi
(74) *Attorney, Agent, or Firm* — Leydig, Voit & Mayer, Ltd.

(57) ABSTRACT

The present application relates to the communications field, and discloses a network device addressing method, device, and system to achieve network device addressing. A specific implementation method includes: constructing, by an interworking function IWF, a host name of a mobility management network element according to an integrated services digital network ISDN number of the mobility management network element; sending, by the IWF, a request message to a home subscriber server HSS, where the request message includes the host name of the mobility management network element; and after receiving a response message sent by the HSS, acquiring, by the IWF, an ISDN number of the HSS according to a host name of the HSS, and sending the ISDN number of the HSS to the mobility management network element.

11 Claims, 5 Drawing Sheets

(56) References Cited

U.S. PATENT DOCUMENTS

2011/0021216 A1* 1/2011 Pudney .................. H04W 4/12
455/466

FOREIGN PATENT DOCUMENTS

| CN | 101094172 A | 12/2007 |
|----|-------------|---------|
| CN | 101426007 A | 5/2009 |
| CN | 101577964 A | 11/2009 |
| CN | 102316448 A | 1/2012 |
| TW | 200917774 A | 4/2009 |

* cited by examiner

NETWORK DEVICE ADDRESSING METHOD, DEVICE, AND SYSTEM

CROSS-REFERENCE TO RELATED APPLICATIONS

This application is a continuation of International Patent Application No. PCT/CN2013/082279, filed on Aug. 26, 2013, which is hereby incorporated by reference in its entirety.

TECHNICAL FIELD

The present application relates to the communications field, and in particular, to a network device addressing method, device, and system.

BACKGROUND

On a 2G/3G (Second Generation Third Generation) GPRS (General Packet Radio Service) network, an SGSN (Serving GPRS Support Node) accesses an HLR (Home Location Register) through a MAP-based Gr interface, and an ISDN (Integrated Services Digital Network) number is used to address each network element node on the GPRS network. However, on an evolved 4G (Fourth Generation) LTE (Long Term Evolution) network, an MME (Mobility Management Entity) accesses an HSS (Home Subscriber Server) through a Diameter-based S6a interface, and a host name/domain name is used to address each network element on the LTE network. Therefore, when an LTE subscriber roams to a GPRS network, an IWF (Interworking Function) needs to implement conversion from the MAP (Mobile Application Part) protocol to the Diameter protocol, so that access authentication and location management can be performed for the subscriber and further the SGSN network element can acquire corresponding subscriber data from the HSS. Conversely, when a GPRS subscriber roams to an LTE network, the IWF needs to implement conversion from the Diameter protocol to the MAP protocol, so that access authentication and location management can be performed for the subscriber and further the MME network element can acquire corresponding subscriber data from the HLR.

An IWF is deployed on an LTE network, and if an ISDN number or a domain name/host name of an SGSN/HLR on a GPRS network of an operator needs to be acquired, a correspondence between the ISDN number and the domain name/host name of the SGSN/HLR of the operator needs to be preconfigured on the IWF. For these reasons, when an additional SGSN/HLR is set up on a GPRS network of another operator who does not run the LTE network, the IWF is probably not notified of the additional SGSN/HLR, that is to say, a correspondence between an ISDN number and a domain name/host name of the additional SGSN/HLR is not configured on the IWF. Consequently, roaming cannot be implemented for subscribers served by the additional SGSN/HLR.

SUMMARY

Embodiments of the disclosure provide a network device addressing method, device, and system, to accomplish network device addressing when a subscriber roams between a 2/3G network and a 4G network.

According to a first aspect, a network device addressing method is provided. The method includes constructing, by an interworking function (IWF), a host name of a mobility management network element according to an integrated services digital network ISDN number of the mobility management network element. The method further includes sending, by the IWF, a request message to a home subscriber server HSS, where the request message includes the host name of the mobility management network element. And after receiving a response message sent by the HSS, the method involves acquiring, by the IWF, an ISDN number of the HSS according to a host name of the HSS and sending the ISDN number of the HSS to the mobility management network element.

According to the first aspect, in a first possible implementation, the constructing, by an interworking function IWF, a host name of a mobility management network element according to an integrated services digital network ISDN number of the mobility management network element involves constructing, by the IWF, the host name of the mobility management network element according to the ISDN number of the mobility management network element and a preconfigured host name format.

With reference to the first aspect or the first possible implementation, in a second possible implementation, the after receiving a response message sent by the HSS, acquiring, by the IWF, an ISDN number of the HSS according to a host name of the HSS, and sending the ISDN number of the HSS to the mobility management network element, includes: after receiving the response message sent by the HSS, acquiring, by the IWF, the ISDN number of the HSS from a preconfigured information mapping table according to the host name of the HSS, and sending the ISDN number of the HSS to the mobility management network element, where the information mapping table is a table presenting a mapping relationship between HSS host names and HSS ISDN numbers; and the response message includes the host name of the HSS.

With reference to the first aspect or the first possible implementation or the second possible implementation, in a third possible implementation, the mobility management network element includes a serving general packet radio service support node SGSN.

According to a second aspect, a network device addressing method is provided, including: sending, by an interworking function IWF, a request message to a home location register HLR, where the request message includes an integrated services digital network ISDN number of a mobility management network element. After receiving a response message sent by the HLR, the method further involves constructing, by the IWF, a host name of the HLR according to an ISDN number of the HLR and sending the host name of the HLR to the mobility management network element.

According to the second aspect, in a first possible implementation, the after receiving a response message sent by the HLR, constructing, by the IWF, a host name of the HLR according to an ISDN number of the HLR, and sending the host name of the HLR to the mobility management network element involves: after receiving the response message sent by the HLR, constructing, by the IWF, the host name of the HLR according to the ISDN number of the HLR and a preconfigured host name format, and sending the host name of the HLR to the mobility management network element, where the response message includes the ISDN number of the HLR.

With reference to the second aspect or the first possible implementation, in a second possible implementation, before the sending, by an interworking function IWF, a request message to a home location register HLR, the method further includes: acquiring, by the IWF, the ISDN number of the mobility management network element from a preconfigured information mapping table according to a host name of the mobility management network element. The information mapping table is a table presenting a mapping relationship between the host names of the mobility management network elements and the ISDN numbers of the mobility management network elements.

With reference to the second aspect or the first possible implementation or the second possible implementation, in a third possible implementation, the mobility management network element includes a mobility management entity MME.

According to a third aspect, an IWF is provided. The IWF includes a processing unit, configured to construct a host name of a mobility management network element according to an integrated services digital network ISDN number of the mobility management network element. The IWF includes a sending unit, configured to send a request message to a home subscriber server HSS, where the request message includes the host name of the mobility management network element. The IWF further includes an acquiring unit, configured to acquire an ISDN number of the HSS according to a host name of the HSS after receiving a response message sent by the HSS. The sending unit is further configured to send the ISDN number of the HSS to the mobility management network element after the acquiring unit acquires the ISDN number of the HSS.

According to the third aspect, in a first possible implementation, the processing unit is configured to: construct the host name of the mobility management network element according to the ISDN number of the mobility management network element and a preconfigured host name format.

With reference to the third aspect or the first possible implementation, in a second possible implementation, the acquiring unit is configured to: after receiving the response message sent by the HSS, acquire the ISDN number of the HSS from a preconfigured information mapping table according to the host name of the HSS, so that the sending unit sends the ISDN number of the HSS to the mobility management network element, where the information mapping table is a table presenting a mapping relationship between HSS host names and HSS ISDN numbers; and the response message includes the host name of the HSS.

With reference to the third aspect or the first possible implementation or the second possible implementation, in a third possible implementation, the mobility management network element includes a serving general packet radio service support node SGSN.

According to a fourth aspect, an IWF is provided which includes a sending unit, configured to send a request message to a home location register HLR, where the request message includes an integrated services digital network ISDN number of a mobility management network element. The IWF further includes a processing unit, configured to construct a host name of the HLR according to an ISDN number of the HLR after receiving a response message sent by the HLR. The sending unit is further configured to send the host name of the HLR to the mobility management network element after the processing unit constructs the host name of the HLR.

According to the fourth aspect, in a first possible implementation, the processing unit is configured to: after receiving the response message sent by the HLR, construct the host name of the HLR according to the ISDN number of the HLR and a preconfigured host name format, so that the sending unit sends the host name of the HLR to the mobility management network element, where the response message includes the ISDN number of the HLR.

With reference to the fourth aspect or the first possible implementation, in a second possible implementation, the IWF further includes: an acquiring unit, configured to acquire the ISDN number of the mobility management network element from a preconfigured information mapping table according to a host name of the mobility management network element. The information mapping table is a table presenting a mapping relationship between the host names of the mobility management network elements and the ISDN numbers of the mobility management network elements.

With reference to the fourth aspect or the first possible implementation or the second possible implementation, in a third possible implementation, the mobility management network element includes a mobility management entity MME.

According to a fifth aspect, an IWF is provided which includes a processor, configured to construct a host name of a mobility management network element according to an integrated services digital network ISDN number of the mobility management network element. The IWF also includes a transmitter, configured to send a request message to a home subscriber server HSS, where the request message includes the host name of the mobility management network element. The processor is further configured to acquire an ISDN number of the HSS according to a host name of the HSS after a receiver receives a response message sent by the HSS, and the transmitter is further configured to send the ISDN number of the HSS to the mobility management network element after the processor acquires the ISDN number of the HSS.

According to the fifth aspect, in a first possible implementation, the processor is configured to: construct the host name of the mobility management network element according to the ISDN number of the mobility management network element and a preconfigured host name format.

With reference to the fifth aspect or the first possible implementation, in a second possible implementation, the processor is configured to: after the receiver receives the response message sent by the HSS, acquire the ISDN number of the HSS from a preconfigured information mapping table according to the host name of the HSS, so that the transmitter sends the ISDN number of the HSS to the mobility management network element. The information mapping table is a table presenting a mapping relationship between HSS host names and HSS ISDN numbers.

With reference to the fifth aspect or the first possible implementation or the second possible implementation, in a third possible implementation, the mobility management network element includes a serving general packet radio service support node SGSN.

According to a sixth aspect, an IWF is provided. The IWF includes a transmitter, configured to send a request message to a home location register HLR, where the request message includes an integrated services digital network ISDN number of a mobility management network element. The IWF further includes a processor, configured to construct a host name of the HLR according to an ISDN number of the HLR after a receiver receives a response message sent by the HLR. The transmitter is further configured to send the host name of the HLR to the mobility management network element after the processor constructs the host name of the HLR.

According to the sixth aspect, in a first possible implementation, the processor is configured to: after the receiver receives the response message sent by the HLR, create the host name of the HLR according to the ISDN number of the HLR and a preconfigured host name format, so that the transmitter sends the host name of the HLR to the mobility management network element.

With reference to the sixth aspect or the first possible implementation, in a second possible implementation, the processor is further configured to acquire the ISDN number of the mobility management network element from a preconfigured information mapping table according to a host name of the mobility management network element. The information mapping table is a table presenting a mapping relationship between the host names of the mobility management network elements and the ISDN numbers of the mobility management network elements.

With reference to the sixth aspect or the first possible implementation or the second possible implementation, in a third possible implementation, the mobility management network element includes a mobility management entity (MME).

According to the network device addressing method, device, and system that are provided in the embodiments of the disclosure, an IWF can create, according to an ISDN number of a mobility management network element or an HLR of a 2/3G operator, a host name corresponding to the mobility management network element or the HLR by adding the ISDN number to the host name. As a result, when a subscriber roams between a 2/3G network and a 4G network, network device addressing is implemented without a need to preconfigure a mapping table between a host name and an ISDN number of the mobility management network element/HLR of the 2/3G operator on the interworking function, thereby avoiding the effort to configure a large amount of mobility management network element/HLR data of the 2/3G operator on the IWF.

BRIEF DESCRIPTION OF DRAWINGS

To describe the technical solutions in the embodiments of the disclosure more clearly, the following briefly introduces the accompanying drawings required for describing the embodiments or the prior art. Apparently, the accompanying drawings in the following description show merely some embodiments of the disclosure, and a person of ordinary skill in the art may still derive other drawings from these accompanying drawings without creative efforts.

DESCRIPTION OF EMBODIMENTS

The following clearly and describes the technical solutions in the embodiments of the disclosure with reference to the accompanying drawings in the embodiments of the disclosure. Apparently, the described embodiments are merely some but not all of the embodiments of the disclosure. All other embodiments obtained by a person of ordinary skill in the art based on the embodiments of the disclosure without creative efforts shall fall within the protection scope of the present application.

Currently, on a 2/3G GPRS network, an SGSN accesses an HLR through a MAP-based Gr interface, and an ISDN number, which is E.164 coding format, is used to address each network element node on the GPRS network. However, on an evolved 4G LTE network, an MME accesses a home subscriber server HSS through a Diameter-based S6a interface, and a domain name/host name, which is Fully Qualified Domain Name (FQDN) format, is generally used to address each network element node on the evolved LTE network. Therefore, when performing MAP-Diameter conversion, an IWF needs to perform one-to-one conversion between ISDN numbers and host names, so that subscriber roaming in a MAP-Diameter conversion scenario can be implemented.

Figure 1:
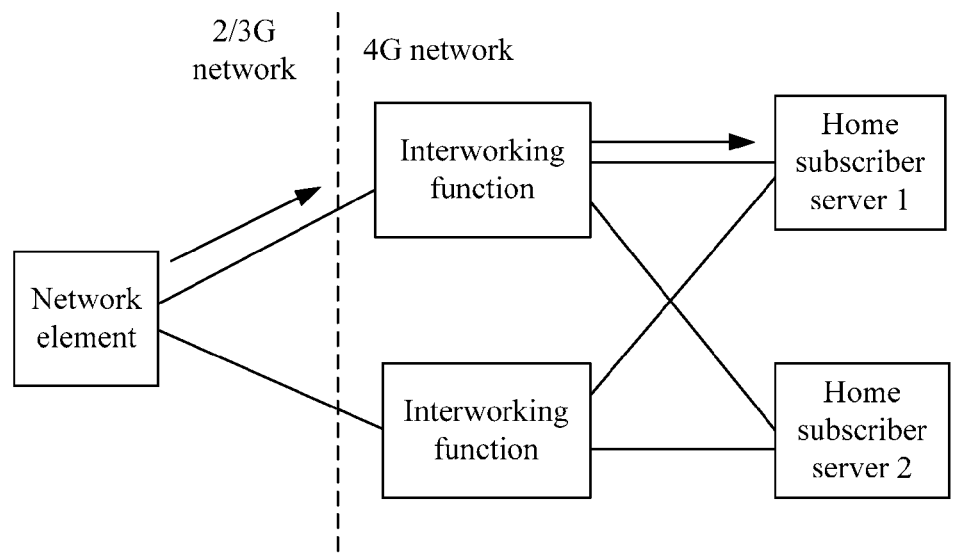
FIG. 1 is a schematic diagram of a system for addressing a network device when a 4G subscriber roams to a 2/3G network according to an embodiment of the disclosure.

As shown in FIG. 1, when an LTE subscriber on a 4G network roams to a 2/3G GPRS network, access authentication and location management need to be performed for the subscriber. In this case, an SGSN network element can acquire corresponding subscriber data from an HSS only when an IWF implements conversion from the MAP protocol to the Diameter protocol.

Figure 2:
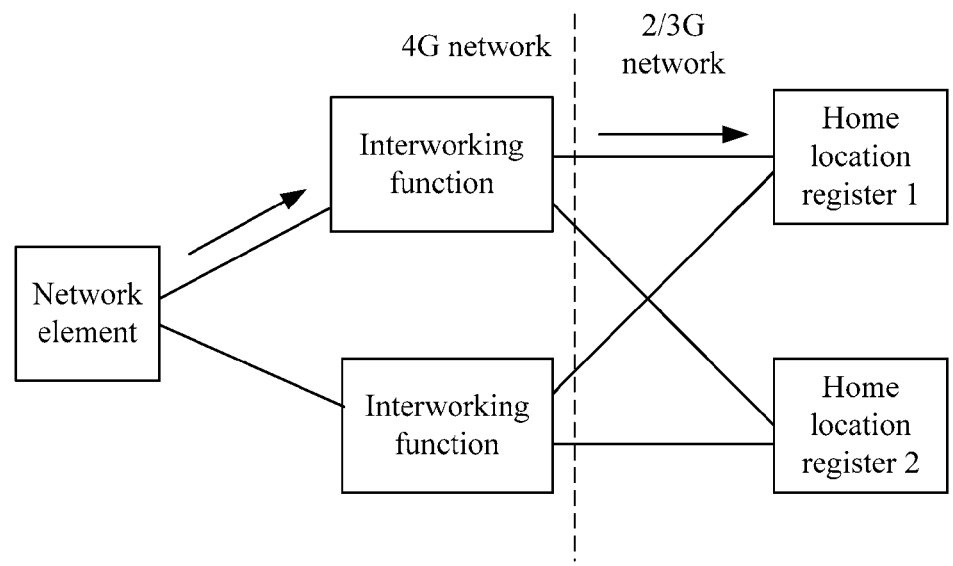
FIG. 2 is a schematic diagram of a system for addressing a network device when a 2/3G subscriber roams to a 4G network according to an embodiment of the disclosure.

As shown in FIG. 2, when a subscriber on a 2/3G GPRS network roams to a 4G LTE network, access authentication and location management need to be performed for the subscriber. In this case, an MME network element can acquire corresponding subscriber data from an HLR only when an IWF implements conversion from the Diameter protocol to the MAP protocol.

Since an IWF is deployed on an LTE network, there is a high likelihood that when an additional SGSN/HLR is set up on a GPRS network of another operator, the IWF is probably not notified of the additional SGSN/HLR. That is to say, a mapping table between an ISDN number and a host name of the additional SGSN/HLR is not configured on the IWF. Consequently, roaming cannot be implemented for subscribers served by the additional SGSN/HLR. Conversely, when an additional MME/HSS is deployed on an LTE network, an IWF may learn of the additional MME/HSS in advance, and all data of the MME/HSS is configured on the IWF. Therefore, roaming may be implemented for subscribers served by the MME/HSS. Embodiments of the disclosure provide a network device addressing method to address the foregoing application scenarios.

Figure 3:
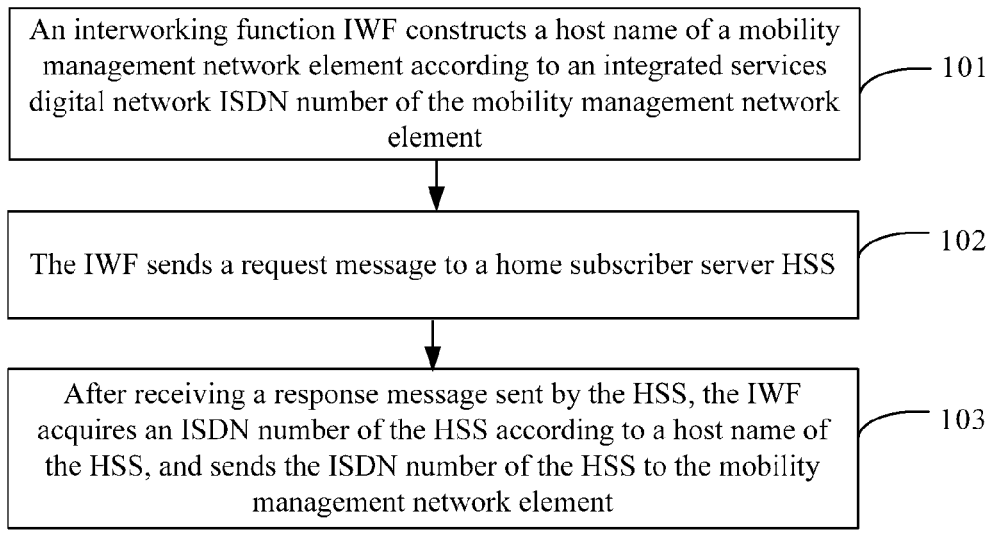
FIG. 3 is a schematic flowchart of a network device addressing method according to an embodiment of the disclosure.

As shown in FIG. 3, when a VPLMN (a public land mobile network visited by an end user) is a 2/3G network and an HPLMN (a home PLMN of an end user) is a 4G network, in other words, when a subscriber on a 4G network roams to a 2/3G network, the network device addressing method includes the following steps:

101: An IWF constructs a host name of a mobility management network element according to an integrated services digital network ISDN number of the mobility management network element.

Optionally, step 101 includes that: the IWF constructs the host name of the mobility management network element according to the ISDN number of the mobility management network element and a preconfigured host name format.

As an example, a 4G network is an LTE network and a 2/3G network is a GPRS network. When an LTE subscriber roams to the GPRS network, the IWF first receives a MAP request message sent by the mobility management network element, and constructs the host name of the mobility management network element according to the ISDN number of the mobility management network element in the MAP request message.

If the ISDN number of the mobility management network element is: 861361234, a domain name of the mobility management network element is: epc.mnc<460>.mcc<001>.3gppnetwork.org, and a host name format of the mobility management network element is: lspc<ISDN number>.sgsn.domain name, then the host name of the mobility management network element is: lspc<861361234>.sgsn.epc.mnc<460>.mcc<001>.3gppnetwork.org.

102: The IWF sends a request message to a home subscriber server HSS.

The request message includes the host name of the mobility management network element constructed in step 101. To achieve access authentication and location management for the subscriber, the IWF needs to implement conversion from the MAP protocol to the Diameter protocol. The IWF sends the host name of the mobility management network element to the HSS in a Diameter message (that is, a request message).

103: After receiving a response message sent by the HSS, the IWF acquires an ISDN number of the HSS according to a host name of the HSS, and sends the ISDN number of the HSS to the mobility management network element.

Optionally, step 103 includes that: after receiving the response message sent by the HSS, the IWF acquires the ISDN number of the HSS from a preconfigured information mapping table according to the host name of the HSS, and sends the ISDN number of the HSS to the mobility management network element.

The foregoing response message includes the host name of the HSS.

The information mapping table is a table presenting a mapping relationship between HSS host names and HSS ISDN numbers. The information mapping table is predefined or preconfigured, and one ISDN number is configured for each HSS of an operator who runs the IWF.

After the IWF receives the response message that is sent by the HSS in response to the Diameter message, it indicates that the HSS has successfully received the host name of the mobility management network element, and the HSS may be able to address the mobility management network element. Then, according to the host name of the HSS, the ISDN number of the HSS is found from the preconfigured information mapping table, and the ISDN number of the HSS is sent to the mobility management network element so that the mobility management network element can address the HSS.

Optionally, the mobility management network element includes an SGSN.

According to the network device addressing method provided in this embodiment of the disclosure, an IWF can create, according to an ISDN number of a mobility management network element of a 2/3G operator, a host name corresponding to the mobility management network element by adding the ISDN number to the host name. So that when a subscriber roams from a 4G network to a 2/3G network, network device addressing can be implemented without a need to preconfigure a mapping table between a host name and an ISDN number of the SGSN/HLR of the 2/3G operator on the interworking function, thereby avoiding the effort to configure a large amount of SGSN/HLR data of the 2/3G operator on the IWF.

Figure 4:
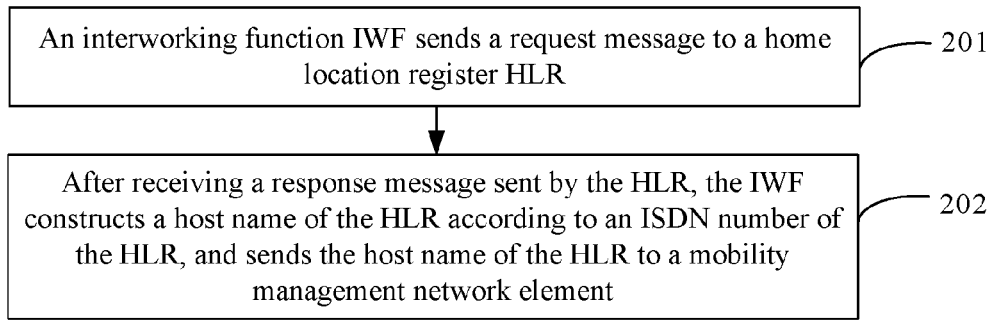
FIG. 4 is a schematic flowchart of another network device addressing method according to an embodiment of the disclosure.

An embodiment of the disclosure provides a network device addressing method. As shown in FIG. 4, when a VPLMN is a 4G network, and an HPLMN is a 2/3G network, in other words, when a subscriber on a 2/3G network roams to a 4G network, the network device addressing method includes the following steps:

201: An IWF sends a request message to an HLR.

The request message includes an ISDN number of a mobility management network element.

Optionally, before step 201, the method further includes that: the IWF acquires the ISDN number of the mobility management network element from a preconfigured information mapping table according to a host name of the mobility management network element.

The information mapping table is a table presenting a mapping relationship between the host names of the mobility management network elements and the ISDN numbers of the mobility management network elements. The information mapping table is predefined or preconfigured, and one ISDN number is configured for each mobility management network element of an operator who runs the IWF.

As an example, a 4G network is an LTE network and a 2/3G network is a GPRS network. When a GPRS subscriber roams to the LTE network, the IWF first receives a Diameter message sent by the mobility management network element, and acquires the ISDN number of the mobility management network element from the preconfigured information mapping table according to the host name of the mobility management network element in the Diameter message. Further, the ISDN number of the mobility management network element is sent to the HLR in the foregoing request message.

202: After receiving a response message sent by the HLR, the IWF constructs a host name of the HLR according to an ISDN number of the HLR, and sends the host name of the HLR to a mobility management network element.

Optionally, step 202 includes that: after receiving the response message sent by the HLR, the IWF creates the host name of the HLR according to the ISDN number of the HLR and a preconfigured host name format, and sends the host name of the HLR to the mobility management network element.

The foregoing response message includes the ISDN number of the HLR.

After the IWF receives the response message that is sent by the HLR in response to the request message, it indicates that the HLR has successfully received the ISDN number of the mobility management network element, and the HLR may be able to address the mobility management network element. Then, according to the ISDN number of the HLR and the preconfigured host name format, the IWF creates the host name of the HLR and sends the host name of the HLR to the mobility management network element, so that the mobility management network element can address the HLR.

If the ISDN number of the HLR is: 861361111, a domain name of the HLR is: epc.mnc<460>.mcc<001>.3gppnetwork.org, and a host name format of the HLR is: lspc<ISDN number>.sgsn.domain name, the host name of the HLR is: lspc<861361234>.sgsn.epc.mnc<460>.mcc<001>.3gppnetwork.org.

Optionally, the mobility management network element includes an MME.

In addition, in a subsequent addressing procedure, after receiving a request message actively initiated by the HLR, the IWF acquires the host name of the mobility management network element according to the ISDN number of the mobility management network element, constructs the host name of the HLR according to the ISDN number of the HLR, and sends a message to the mobility management network element. Alternatively, after receiving a request message initiated by the mobility management network element, the IWF searches a table according to the host name of the mobility management network element to acquire the ISDN number of the mobility management network element, acquires the ISDN number of the HLR according to a destination host name, and sends a message to the HLR.

According to the network device addressing method provided in this embodiment of the disclosure, an interworking function IWF can create, according to an ISDN number of an HLR of a 2/3G operator, a host name corresponding to the HLR by adding the ISDN number to the host name. So that when a subscriber roams from a 2/3G network to a 4G network, network device addressing can be implemented without a need to preconfigure a mapping table between a host name and an ISDN number of the SGSN/HLR of the 2/3G operator on the interworking function, thereby avoiding the effort to configure a large amount of SGSN/HLR data of the 2/3G operator on the IWF.

Figure 5:
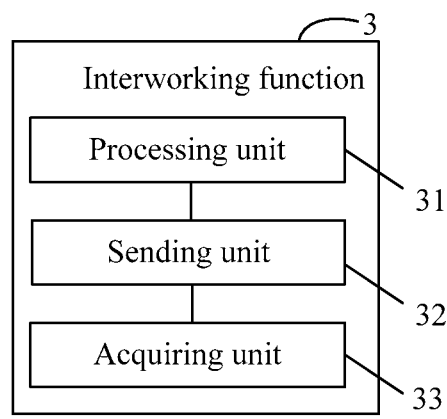
FIG. 5 is a schematic structural diagram of an interworking function IWF according to an embodiment of the disclosure.

An embodiment of the disclosure provides an IWF. As shown in FIG. 5, the IWF includes a processing unit 31, a sending unit 32, and an acquiring unit 33.

The processing unit 31 is configured to construct a host name of a mobility management network element according to an integrated services digital network ISDN number of the mobility management network element.

The sending unit 32 is configured to send a request message to an HSS, where the request message includes the host name of the mobility management network element.

The acquiring unit 33 is configured to acquire an ISDN number of the HSS according to a host name of the HSS after receiving a response message sent by the HSS.

The sending unit 32 is further configured to send the ISDN number of the HSS to the mobility management network element after the acquiring unit 33 acquires the ISDN number of the HSS.

Optionally, the processing unit 31 is configured to: construct the host name of the mobility management network element according to the ISDN number of the mobility management network element and a preconfigured host name format.

Optionally, the acquiring unit 33 is configured to: after receiving the response message sent by the HSS, acquire the ISDN number of the HSS from a preconfigured information mapping table according to the host name of the HSS, so that the sending unit 32 sends the ISDN number of the HSS to the mobility management network element. The information mapping table is a table presenting a mapping relationship between HSS host names and HSS ISDN numbers, and the response message includes the host name of the HSS.

Optionally, the mobility management network element includes an SGSN.

The IWF provided in this embodiment of the disclosure can create, according to an ISDN number of a mobility management network element of a 2/3G operator, a host name corresponding to the mobility management network element by adding the ISDN number to the host name. As a result, when a subscriber roams from a 4G network to a 2/3G network, network device addressing can be implemented without a need to preconfigure a mapping table between a host name and an ISDN number of the SGSN/HLR of the 2/3G operator on the interworking function, thereby avoiding the effort to configure a large amount of SGSN/HLR data of the 2/3G operator on the IWF.

Figure 6:
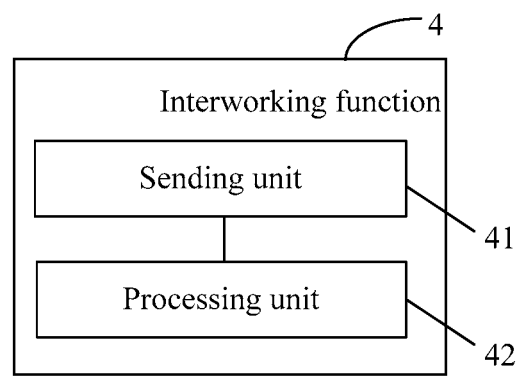
FIG. 6 is a schematic structural diagram of another interworking function IWF according to an embodiment of the disclosure.

An embodiment of the disclosure provides an IWF. As shown in FIG. 6, the IWF includes a sending unit 41 and a processing unit 42.

The sending unit 41 is configured to send a request message to an HLR, where the request message includes an integrated services digital network ISDN number of a mobility management network element.

The processing unit 42 is configured to construct a host name of the HLR according to an ISDN number of the HLR after receiving a response message sent by the HLR.

The sending unit 41 is further configured to send the host name of the HLR to the mobility management network element after the processing unit 42 constructs the host name of the HLR.

Optionally, the processing unit 42 is configured to: after receiving the response message sent by the HLR, construct the host name of the HLR according to the ISDN number of the HLR and a preconfigured host name format, so that the sending unit 41 sends the host name of the HLR to the mobility management network element, where the response message includes the ISDN number of the HLR.

Figure 7:
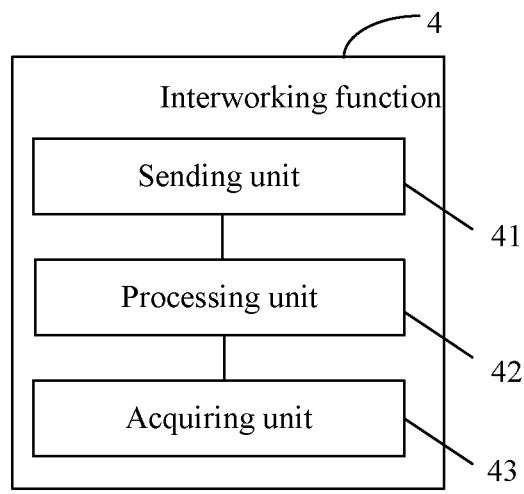
FIG. 7 is a schematic structural diagram of still another interworking function IWF according to an embodiment of the disclosure.

Optionally, as shown in FIG. 7, the IWF further includes: an acquiring unit 43, configured to acquire the ISDN number of the mobility management network element from a preconfigured information mapping table according to the host name of the mobility management network element. The information mapping table is a table presenting a mapping relationship between the host names of the mobility management network elements and the ISDN numbers of the mobility management network elements.

Optionally, the mobility management network element includes a mobility management entity MME.

The IWF provided in this embodiment of the disclosure can create, according to an ISDN number of an HLR of a 2/3G operator, a host name corresponding to the HLR by adding the ISDN number as part of the host name. As a result, when a subscriber roams from a 2/3G network to a 4G network, network device addressing can be implemented without a need to preconfigure a mapping table between a host name and an ISDN number of the SGSN/HLR of the 2/3G operator on the interworking function, thereby avoiding the effort to configure a large amount of SGSN/HLR data of the 2/3G operator on the IWF.

Figure 8:
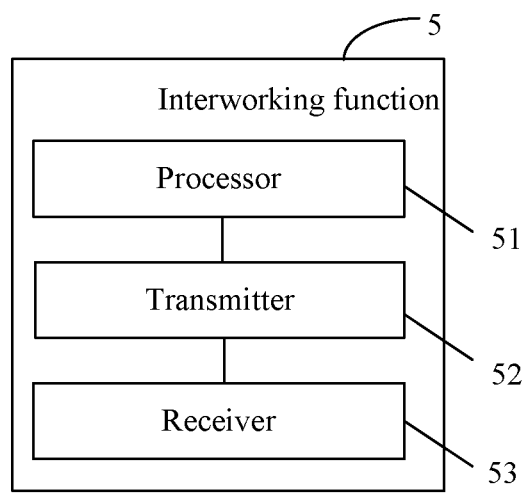
FIG. 8 is a schematic structural diagram of an interworking function IWF according to another embodiment of the disclosure.

FIG. 8 shows an IWF provided in an embodiment of the disclosure. The IWF includes a processor 51, a transmitter 52, and a receiver 53.

The processor 51 is configured to construct a host name of a mobility management network element according to an ISDN number of the mobility management network element.

The transmitter 52 is configured to send a request message to an HSS, where the request message includes the host name of the mobility management network element.

The processor 51 is further configured to acquire an ISDN number of the HSS according to a host name of the HSS after the receiver 53 receives a response message sent by the HSS.

The transmitter 52 is further configured to send the ISDN number of the HSS to the mobility management network element after the processor 51 acquires the ISDN number of the HSS.

Optionally, the processor 51 is configured to: construct the host name of the mobility management network element according to the ISDN number of the mobility management network element and a preconfigured host name format.

Optionally, the processor 51 is configured to: after the receiver 53 receives the response message sent by the HSS, acquire the ISDN number of the HSS from a preconfigured information mapping table according to the host name of the HSS, so that the transmitter 52 sends the ISDN number of the HSS to the mobility management network element, where the information mapping table is a table presenting a mapping relationship between HSS host names and HSS ISDN numbers.

Optionally, the mobility management network element includes an SGSN.

The IWF provided in this embodiment of the disclosure can create, according to an ISDN number of a mobility management network element of a 2/3G operator, a host name corresponding to the mobility management network element by adding the ISDN number to the host name. As a result, when a subscriber roams from a 4G network to a 2/3G network, network device addressing can be implemented without a need to preconfigure a mapping table between a host name and an ISDN number of the SGSN/HLR of the 2/3G operator on the interworking function, thereby avoiding the effort to configure a large amount of SGSN/HLR data of the 2/3G operator on the IWF.

Figure 9:
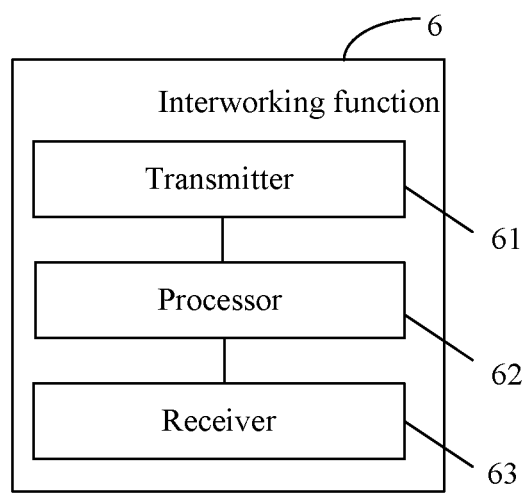
FIG. 9 is a schematic structural diagram of another interworking function IWF according to another embodiment of the disclosure.

FIG. 9 shows an IWF provided in an embodiment of the disclosure. The IWF includes a transmitter 61, a processor 62, and a receiver 63.

The transmitter 61 is configured to send a request message to a HLR, where the request message includes an ISDN number of a mobility management network element.

The processor 62 is configured to construct a host name of the HLR according to an ISDN number of the HLR after the receiver 63 receives a response message sent by the HLR.

The transmitter 61 is further configured to send the host name of the HLR to the mobility management network element after the processor 62 constructs the host name of the HLR.

Optionally, the processor 62 is configured to: after the receiver 63 receives the response message sent by the HLR, construct the host name of the HLR according to the ISDN number of the HLR and a preconfigured host name format, so that the transmitter 61 sends the host name of the HLR to the mobility management network element.

Optionally, the processor 62 is further configured to: acquire the ISDN number of the mobility management network element from a preconfigured information mapping table according to the host name of the mobility management network element. The information mapping table is a table presenting a mapping relationship between the host names of the mobility management network elements and the ISDN numbers of the mobility management network elements.

Optionally, the mobility management network element includes an MME.

The IWF provided in this embodiment of the disclosure can create, according to an ISDN number of an HLR of a 2/3G operator, a host name corresponding to the HLR by adding the ISDN number to the host name. As a result, when a subscriber roams from a 2/3G network to a 4G network, network device addressing can be implemented without a need to preconfigure a mapping table between a host name and an ISDN number of the SGSN/HLR of the 2/3G operator on the interworking function. This reduces configuration effort as it is unnecessary to configure a large amount of SGSN/HLR data of the 2/3G operator on the IWF.

An embodiment of the disclosure provides a network device addressing system. As shown in FIG. 1, the network device addressing system includes: a mobility management network element, an IWF, and an HSS, where the IWF is any IWF in the foregoing embodiments.

In the network device addressing system provided in this embodiment of the disclosure, an IWF can create, according to an ISDN number of a mobility management network element or an HLR of a 2/3G operator, a host name corresponding to the mobility management network element by adding the ISDN number to the host name. As a result, when a subscriber roams from a 4G network to a 2/3G network, addressing of a network device is implemented without a need to preconfigure a mapping table between a host name and an ISDN number of the SGSN/HLR of the 2/3G operator on the interworking function, thereby avoiding the effort to configure a large amount of SGSN/HLR data of the 2/3G operator on the IWF.

An embodiment of the disclosure provides a network device addressing system. As shown in FIG. 2, the network device addressing system includes: a mobility management network element, an IWF, and an HLR, where the IWF is any IWF in the foregoing embodiments.

In the network device addressing system provided in this embodiment of the disclosure, an IWF can create, according to an ISDN number of a mobility management network element or an HLR of a 2/3G operator, a host name corresponding to the SGSN/HLR. As a result, when a subscriber roams from a 2/3G network to a 4G network, addressing of a network device is implemented without a need to preconfigure a mapping table between a host name and an ISDN number of the SGSN/HLR of the 2/3G operator on the interworking function, thereby avoiding the effort to configure a large amount of SGSN/HLR data of the 2/3G operator on the IWF.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read only memory (ROM), a random access memory (RAM), a magnetic disk, or an optical disc.

The foregoing descriptions are merely exemplary implementations of the embodiments of the disclosure, but are not intended to limit the protection scope of the present application. Any variation or replacement readily figured out by a person skilled in the art within the technical scope disclosed shall fall within the protection scope of the present application. Therefore, the protection scope of the present application shall be subject to the protection scope of the claims.

What is claimed is:

1. A method for implementing network device addressing without pre-configuring a mapping table on interworking function (IWF) equipment that maps between a host name and an integrated services digital network (ISDN) number of a mobility management network element, the method comprising:

constructing, by the interworking function (IWF) equipment, a host name of the mobility management network element according to (a) an ISDN number of the mobility management network element, (b) a domain name of the mobility management network element, and (c) a host name format of the mobility management network element, which are received from the mobility management network element;

sending, by the IWF equipment, the constructed host name of the mobility management network element to a home subscriber server (HSS);

receiving, by the IWF equipment, a host name of the HSS sent by the HSS;

acquiring, by the IWF equipment, an ISDN number of the HSS according to the host name of the HSS; and sending the ISDN number of the HSS to the mobility management network element.

2. The method according to claim 1, wherein acquiring the ISDN number of the HSS comprises:

acquiring, by the IWF equipment the ISDN number of the HSS from a preconfigured information mapping table according to the host name of the HSS, wherein the information mapping table is a table presenting a mapping relationship between HSS host names and HSS ISDN numbers and wherein a response message sent by the HSS comprises the host name of the HSS.

3. The method according to claim 1, wherein the mobility management network element comprises a serving general packet radio service support node (SGSN).

4. A method for implementing network device addressing without pre-configuring a mapping table on interworking function (IWF) equipment that maps between a host name and an integrated services digital network (ISDN) number of a home location register (HLR), the method comprising:

sending, by the IWF equipment, a request message to the HLR, wherein the request message comprises an integrated services digital network (ISDN) number of a mobility management network element;

receiving, by the IWF equipment, a response message from the HLR, wherein the response message comprises the ISDN number of the HLR;

constructing, by the IWF equipment, a host name of the HLR according to the ISDN number of the HLR and a preconfigured host name format; and sending the host name of the HLR to the mobility management network element.

5. The method according to claim 4, before sending the request message to the HLR, the method further comprising:

acquiring, by the IWF equipment, the ISDN number of the mobility management network element from a preconfigured information mapping table according to a host name of the mobility management network element, wherein the information mapping table is a table presenting a mapping relationship between host names of the mobility management network elements and the ISDN numbers of the mobility management network elements.

6. The method according to claim 4, wherein the mobility management network element comprises a mobility management entity (MME).

7. Interworking function (IWF) equipment comprising a processor and a non-transitory processor readable memory storing instructions for execution by the processor such that, when the instructions are executed, the processor is configured to:

construct a host name of a mobility management network element according to (a) an integrated services digital network (ISDN) number of the mobility management network element, (b) a domain name of the mobility management network element, and (c) a host name format of the mobility management network element, which are received from the mobility management network element;

send a request message to a home subscriber server (HSS);

acquire an ISDN number of the HSS according to the host name of the HSS after a receiver receives a response message sent by the HSS; and send the ISDN number of the HSS to the mobility management network element;

wherein network device addressing is accomplished without pre-configuring a mapping table on the IWF equipment that maps between the host name and the ISDN number of the mobility management network element.

8. The IWF equipment according to claim 7, wherein the processor is further configured to acquire the ISDN number of the HSS from a preconfigured information mapping table according to the host name of the HSS, wherein the information mapping table is a table presenting a mapping relationship between HSS host names and HSS ISDN numbers.

9. The IWF equipment according to claim 7, wherein the mobility management network element comprises a serving general packet radio service support node (SGSN).

10. Interworking function (IWF) equipment comprising a processor and a non-transitory processor readable memory storing instructions for execution by the processor such that, when the instructions are executed, the processor is configured to:

send a request message to a home location register (HLR), wherein the request message comprises an integrated services digital network (ISDN) number of a mobility management network element;

construct a host name of the HLR according to an ISDN number of the HLR and a preconfigured host name format after the HLR responds to the request message; and send the host name of the HLR to the mobility management network element wherein network device addressing is accomplished without pre-configuring a mapping table on the IWF equipment that maps between the host name and the ISDN number of the HLR.

11. The IWF equipment according to claim 10, wherein the processor is further configured to acquire the ISDN number of the mobility management network element from a preconfigured information mapping table according to a host name of the mobility management network element, wherein the information mapping table is a table presenting a mapping relationship between the host names of the mobility management network elements and the ISDN numbers of the mobility management network elements.

* * * * *